Oct. 13, 1970 J. J. DRAUTMAN, JR 3,534,308

SUPERCONDUCTIVE MAGNET CONSTRUCTION

Filed May 22, 1967 2 Sheets-Sheet 1

INVENTOR

James J. Drautman, Jr.

BY Simon Yaffee

ATTORNEY

Oct. 13, 1970 J. J. DRAUTMAN, JR 3,534,308

SUPERCONDUCTIVE MAGNET CONSTRUCTION

Filed May 22, 1967 2 Sheets-Sheet 2

INVENTOR
James J. Drautman, Jr.
BY Simon Yaffee
ATTORNEY

United States Patent Office 3,534,308
Patented Oct. 13, 1970

3,534,308

SUPERCONDUCTIVE MAGNET CONSTRUCTION

James J. Drautman, Jr., Annandale, N.J., assignor to RCA Corporation, a corporation of Delaware Filed May 22, 1967, Ser. No. 640,314
Int. Cl. H01f 7/22
U.S. Cl. 335—216 3 Claims

ABSTRACT OF THE DISCLOSURE

Resistive shunts are provided for stabilizing a superconductive magnet and at the same time for greatly reducing the time constant thereof.

BACKGROUND OF THE INVENTION

This invention relates to the construction of superconductive magnets.

Superconductive magnets are constructed by winding a superconducting wire or ribbon on a supporting core. A superconductor at room temperature typically has a resistance that is high in comparison to that of copper or silver. At cryogenic temperatures, the superconductor exhibits zero resistance provided that the current, field and temperature are all below certain critical values, each of these critical values being influenced by the value of the other two parameters. An operating magnet can be produced by building up the current in the winding of the superconductive magnet to a desired value while the magnet is maintained at temperatures below the critical temperature of the material being used. However, due to various reasons, such as flux motion while building up the field in the magnet, local thermal or electromagnetic disturbances may be produced in the superconductive winding that will cause a portion of the superconductor to become normal or, in other words, revert to its high resistance condition. When this happens, unless precautions are taken to prevent it, the whole magnetic field of the magnet collapses, resulting in possible damage to the magnet due to the developed large forces and high voltages. Also, when the superconductive magnet becomes normal unintentionally, the process of building up the field thereof must be gone through again. A known means for stabilizing a superconductive magnet, that is a means that tends to prevent the magnet from becoming normal, includes normally highly conductive shorting bars positioned in contact with the turns of the windings of a superconductive magnet to provide a shunt around any portion of the superconductive magnet that may momentarily become normal. These shorting bars carry the current around the normal portion of the superconductive magnet while that portion of the superconductive magnet becomes superconductive as by cooling thereof. While such stabilizing means tends to stabilize a superconductive magnet, this stabilizing means also increases the time constant of the magnet, that is, the time that it takes to build up the field therefrom from zero to the operating value of the magnet. Furthermore, the shorting bars pass current perpendicular to the turns in such a way that this portion of the current passing through the bars does not contribute to the desired magnetic field. Also after the current in the superconductive magnet has been built up to its rated value, current flows in the circuit provided by the shorting bars for an appreciable period of time after the current supply is disconnected fom the superconductive winding, whereby passage of a period of time is necessary before the magnetic field produced by the superconductive magnet arrives at a steady and uniform value.

It is an object of this invention to provide an improved superconductive magnet.

It is another object of this invention to provide a stabilizing means for a superconductive magnet that permits build up of current in the winding thereof more quickly than in the prior art.

SUMMARY OF THE INVENTION

In accordance with the invention, resistive shunts are provided around the several portions of the superconductive windings of a superconductive magnet. In accordance with one embodiment of this invention, these shunts comprise one or more resistive strips in contact with the superconductive windings, the strips extending transversely to the winding whereby each strip contacts the conductor comprising a winding layer at several points. In accordance with another embodiment of the invention, the shunts comprise a sheet of resistive material in contact with the turns comprising a winding layer. The resistive sheet may comprise an open or incomplete winding turn. The resistive shunts provide a path which has high resistance compared to the reactance of the superconductive winding when it is in superconductive condition, whereby the shunts provide paths for very little current away from the superconductive winding during current build up in the superconductive magnet. However, the shunt provides a path of relatively low resistance around any portion of the superconductor that has momentarily gone normal during the period of time required to withdraw sufficient heat from the normal portion to again render it superconductive. The shunts thereby act to stabilize the superconductive magnet. Furthermore, the resistive shunts normally carry very little current when the current through the magnet is varied, whereby the time constant of the magnet is decreased.

BRIEF DESCRIPTION OF THE DRAWINGS

The invention will be better understood when the following explanation is read in conjunction with the accompanying drawing in which.

DESCRIPTION

Figures 1, 2:
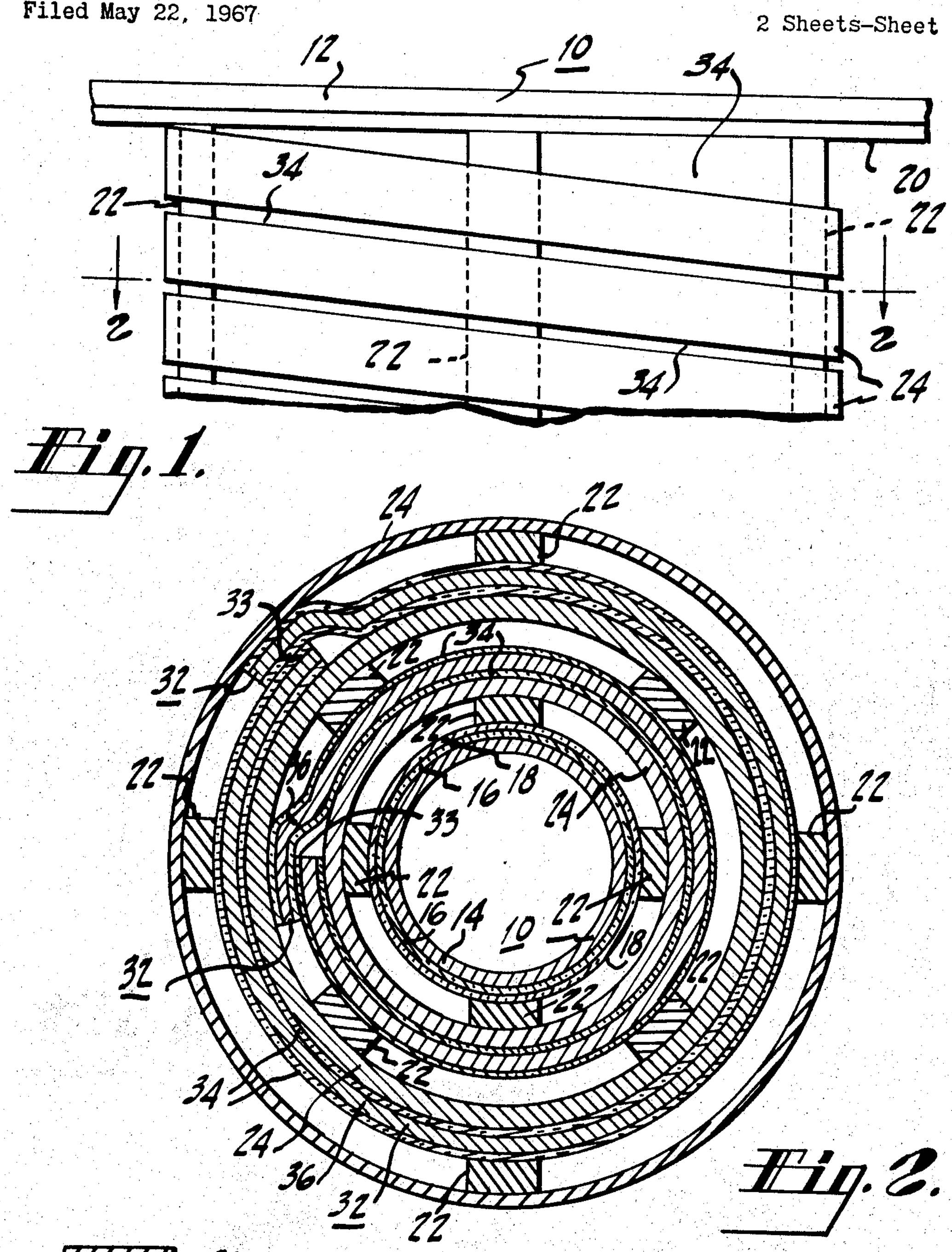
FIG. 1 is a partial side elevational view of a superconductive magnet that is partially completed.
FIG. 2 is a cross sectional view of a superconductive magnet constructed in the manner of that shown in FIG. 1 and which shows a cross sectional construction thereof on the line 2—2 of FIG. 1 and illustrates one embodiment of this invention.

As shown in FIGS. 1 and 2, a winding spool 10 is provided having a flange 12 at each end thereof (only one flange being shown) and having a central tube portion 14. This spool 10 may be of any material which is sufficiently physically strong as a core for the superconductive magnet to be wound thereon. The spool 10 is usually made of aluminum or stainless steel. As shown in FIG. 2, one or more layers of insulation 16 and 18 are placed on the tube 14. While this insulation is shown as being cylindrical, it may actually be produced by winding a sheet of insulation on the tube 14 or by applying coatings to the tube 14. Also, a layer of insulation 20 is provided on the inside surfaces of the flanges 12.

Shunting strips 22 are laid on the insulation 18 for a purpose to be explained. These shunting strips are of a material having a resistivity which is higher than copper and which does not exhibit superconductive properties. Examples of such material are phosphor bronze, brass or stainless steel. The shunting strips 22 are laid on the insulation 18 in such a direction that they each contact the turns of a layer of the winding of superconductor ribbon to be described, in several places. As illustrated, the shunting strips 22 are laid on the insulation 18 in a direction parallel to the axis of the spool 10.

Figure 3:
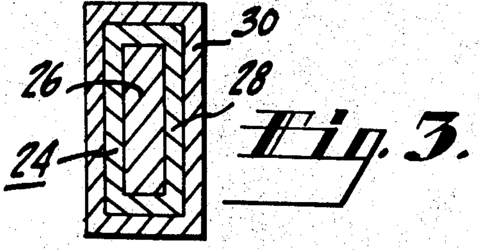
FIG. 3 is a cross sectional view of one example of a superconductive ribbon that is suitable for winding the superconductive magnet of FIGS. 1 and 2.

A superconductive ribbon or superconductor 24 is carefully wound in a helical manner from one end of the spool to the other over the strips 22. The superconductor 24 is wound with a uniform tension in such a manner as to provide uniform distance between the adjacent edges of the turns. A connection (not shown) is made to one end of the ribbon 24, this connection extending out of the superconductive magnet beyond the flange 12. The ribbon 24 may comprise a stainless steel substrate 26 as shown in FIG. 3, a layer of superconductive material 28 such as niobium stannide on the substrate 26, and a layer 30 of a normal conductor such as silver on the superconductive layer 28.

A composite interlayer sheet 32 is next wound around the completed superconductor layer. The interlayer sheet 32 is overlapped for a short distance as shown at 33. This interlayer sheet comprises an insulating film 34, a sheet of conductor 36 which remains normal at cryogenic temperatures, such as copper, and another insulating film 34. Although the conductive sheet 36 extends for more than 360 degrees, a short is not completed thereby due to the fact that the overlapping portions of the sheet 36 are insulated from each other by the insulating films 34.

More shunting strips 22 are positioned on the composite interlayer sheet 32 and another layer of superconductive ribbon 24 is wound over the shunting bars 22, and these steps are repeated until the magnet is completely wound, current and metering connections being made to the superconductive ribbon 24 where necessary in a known manner.

A superconductive magnet having the structural features herein described will have a reduced tendency to become normal during operation or during changing conditions such as a change of current, of field or temperature. Yet, such a magnet will have a shorter time constant than known superconductive magnets as will be explained.

While the winding of the magnet when it is in superconductive condition has no resistance, still the winding has finite reactance which is proportional to the inductance of the magnet and to the rate of change of current therethrough. If, as taught by the prior art, the shorting bars were of copper, the resistance they present would be low and in the order of magnitude of the reactance of the superconductive magnet while the current therethrough was being increased from zero to its rated value. Therefore, a substantial portion of the current fed to the magnet winding during current build up would be shunted through the bars, reducing the speed of build up of current in the magnet winding. Furthermore, the current flowing through the copper bars would produce heat due to the $I^2R$ losses therein, this heat being detrimental to the operation of a superconductive magnet. Also, if an attempt were made to speed up the current growth in the superconductive magnet windings, the reactance of the windings would also increase, causing greater shunting action by the bars and greater heat production. Therefore, the use of low reactance shunting bars necessarily results in a long time constant superconductive magnet, and reduces the critical current-critical field values due to increased temperature when the current is varied.

However, where, as here, the resistivity of the strips is higher than copper, the reactance of the winding during current build up therein is low compared to the resistance of the shunting strips 22 and a much greater proportion of the current fed to the magnet during current build up flows in the winding and a lesser proportion flows in the shunting strips. Therefore, less heat is produced in the shunting strips since the heat produced is proportional to the first power of the resistance of the strips and to the second power of the current flow therein. Furthermore, current may be built up in the magnet much faster due to the comparatively high ratio of resistance of the shunting strips 22 to the reactance of the winding. Also, whatever small currents that circulate in the shunting strips dissipate much faster therein than when highly conductive shunting bars are used, after the current in the magnet has been built up to its rated value.

However, the resistance provided by the shunting strips 22 around any portion of the superconductor 24 that may become normal for any reason, for example, due to flux motion therein, is low with respect to the resistance of the superconductive material in its normal state. Therefore, the strips 22 will shunt the normal portion of the superconductor until such time as the condition causing normality has passed, whereby the shunting strips 22 act as stabilizing means for the superconductive magnet.

As noted, moving flux in a superconductor can cause the superconductor to become normal. The copper layer 36 of the interlayer sheet 32 adds to the stability of the superconductive magnet by attenuating the flux motion or jump which takes place when the flux moves through a superconductor in an attempt to obtain equilibrium in the body of the magnet. Since the use and operation of the interlayer sheets 32 is well known, no further description thereof is necessary.

Figure 4:
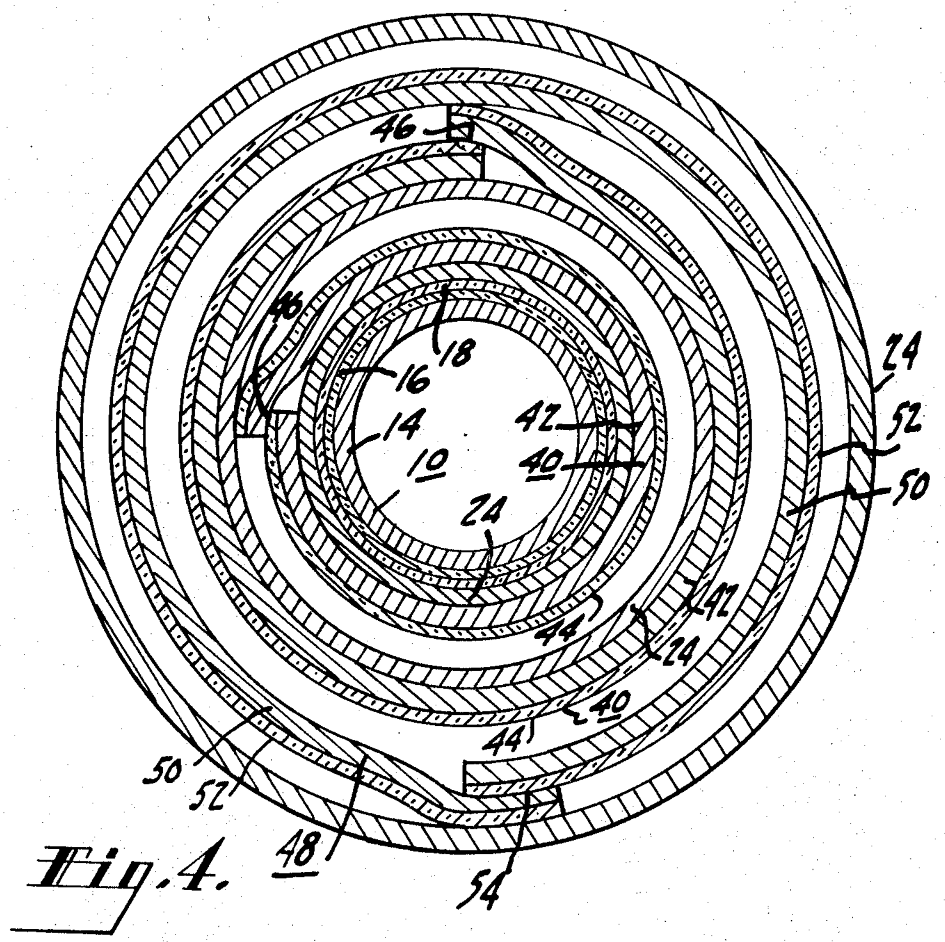
FIG. 4 is a cross sectional view of a second embodiment of a superconductive magnet of this invention.

FIG. 4 exhibits a second embodiment of the resistive shunting means of this invention. In the several figures of the drawing, the same reference characters refer to similar elements. In FIG. 4, one or more layers 16 and 18 of insulation are provided on the tube 14 comprising a part of the winding spool 10 and the superconductor 24 is wound on the layers of insulation. However, no shunting strips are provided in FIG. 4. Instead of strips, a single turn of a composite sheet 40 is wound on the winding of the conductor 24. The sheet 40 comprises a resistive sheet 42 and an insulating sheet 44. The composite sheet 40 is so placed on the layer of winding that the resistive sheet contacts each of the turns of the conductor 24 comprising the winding layer. Also, the ends of the composite sheet 40 overlap as at 46. Therefore, due to the contact of the insulating sheet 44 with the conductive sheet 42, the composite sheet 40 does not provide a complete turn. However, the resistive sheet 42 provides a shunt between adjacent portions of the conductor 24. Another layer of conductor 24 is wound on the composite sheet 40 and another incomplete turn of the composite sheet 40, having an overlap 46, is wound on the winding of the conductor 24, with the conductive portion 42 of the composite sheet 40 in contact with the superconductor 24 comprising the other winding layer. These winding steps are repeated until the superconductive magnet is completed, current and metering connections being made to the superconductor 24 where necessary in a known manner. However, since the resistance presented by the composite sheet 40 may prevent the composite sheet 40 from sufficiently attenuating flux jump mentioned above to stabilize the magnet against flux jump, a composite sheet 48 may be wound between the insulating sheet 44 of every tenth (for example) composite sheet 40 and its adjacent winding layer of superconductor 24. This composite sheet 48 comprises a normally highly conductive sheet 50 and an insulating sheet 52 wound so that the ends overlap as shown at 54 whereby, the sheet 48 does not provide a complete turn. However, the insulating sheet 52 and the insulating sheet 44 which face opposite sides of the highly conductive sheet 50 insulate the sheet 50 from both the superconductor 24 and the resistive sheet 42. This conductive sheet 48 acts in a known manner to attenuate any flux jump that takes place and so adds stability to the magnet of FIG. 4.

The showing of the figures is for clarity of disclosure. No attempt has been made to show the magnet construction in actual proportion in the figures. In the actual magnet in accordance with FIG. 4, the composite sheets 40 and 48 are very thin, and there are no void spaces in either of FIGS. 1 and 2.

Since the respective resistive sheets 42 are in contact with the conductors 24 of the several winding layers thereof, the resistive sheets 42 act as resistive shunts for whatever portion of the winding of the superconductor 24 that becomes normal momentarily whereby the sheets 42 act in the same manner as the several shunting strips 22 of FIG. 2, to decrease the time constant of the superconductive magnet constructed as disclosed herein.

While only two embodiments of the improved superconductive magnet has been described, modifications thereof will suggest themselves to a person skilled in the art. For example, the superconductor 24 may be of any suitable cross sectional form other than the ribbon-like form disclosed. Similarly, a core 10 having no flange 12 or insulation 20, may be used. Only one layer of insulation 16 or 18 on the core 10 may be necessary. Or in fact if an insulating core 10 is used, no insulation on the core itself may be necessary. The description is therefore to be considered as illustrative, and not in a limiting sense.

What is claimed is:

1. A superconductive magnet comprising a layer of turns of a superconductor wound in a helical manner about an axis, said turns being spaced from each other along said axis, resistive shunting means in contact with the superconductor of said layer of turns for minimizing the time constant of said magnet, said shunting means comprising at least one resistive shunting strip extending in a direction transverse to said turns with said strip in electrical contact with a plurality of turns of said superconductive winding, and including an unclosed highly conductive turn of sheet material surrounding said layer and said shunting means, said highly conductive sheet being insulated both from said turns comprising said layer and from said shunting means.

2. A superconductive magnet comprising a layer of turns of a superconductor wound in a helical manner about an axis, said turns being spaced from each other along said axis, resistive shunting means in contact with the superconductor of said layer of turns for minimizing the time constant of said magnet, said shunting means comprising a sheet-like turn of resistive material arranged in electrical contact with said turns of superconductor, and including an unclosed turn of highly conductive sheet material surrounding said winding layer and said turn of resistive material.

3. The invention as expressed in claim 2, in which said sheet-like turn is unclosed.

References Cited

UNITED STATES PATENTS

| | | | |
|---|---|---|---|
| 3,205,461 | 9/1965 | Anderson | 335—216 XR |
| 3,336,549 | 8/1967 | Kafka et al. | 335—216 |
| 3,363,207 | 1/1968 | Brechna | 335—216 |

FOREIGN PATENTS

| | | |
|---|---|---|
| 1,402,426 | 5/1965 | France. |

OTHER REFERENCES

Journal of Applied Physics, vol. 33, No. 12, December 1962, an article by Riemersma et al., pp. 3499–3504.

GEORGE HARRIS, Primary Examiner

U.S. Cl. X.R.

338—32